Figure 1:
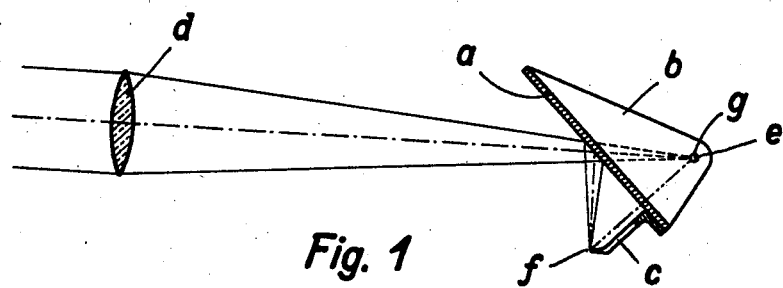

March 25, 1941.   N. GÜNTHER   2,236,403
REFLECTING SYSTEM FOR DEVIATING A CONVERGENT PENCIL OF IMAGING RAYS
Filed Jan. 25, 1940

Inventor:
Dr. Norbert Günther

Patented Mar. 25, 1941

2,236,403

UNITED STATES PATENT OFFICE

2,236,403

REFLECTING SYSTEM FOR DEVIATING A CONVERGENT PENCIL OF IMAGING RAYS

Norbert Günther, Jena, Germany, assignor to the firm of Carl Zeiss, Jena, Germany Application January 25, 1940, Serial No. 315,600
In Germany February 9, 1939

1 Claim. (Cl. 88—2.2)

The paths of imaging rays of numerous optical measuring instruments are deviated in the measuring plane from their original direction by means of mirror systems or reflecting prisms. As an example of such instruments the known rangefinders are referred to. The construction of a rangefinder, for example, is as follows. An outer tube surrounds all optical parts of the instrument. At the ends of the outer tube the pencils of imaging rays enter through reflecting systems by which these pencils are deviated into the direction of the basis of the rangefinder. The central part of the outer tube carries a plate to which—besides some elements not coming into consideration here—one or two eyepieces are so attached that their axes stand at right angles to the basis. Within the outer tube an inner tube, in two of its cross sections, is supported in universal joints thus resulting in any flexures of the outer tube not being transferred in general upon the inner tube. In its ends the inner tube carries the rangefinder-objectives and in its central part it assumes a box-like shape. In this box-like part a so-called prism-stool is so attached with screws that, for adjusting purposes, and prior to the screws being finally stiffened, it can be shifted by small amounts at right angles to the axis of the inner tube. The prism stool consists of the same material as the inner tube and contains the ocular reflecting system which is provided with one or several measuring marks and which deviates the pencils of imaging rays into the direction of the ocular axis or axes.

Whilst heat unilaterally applied to the outer tube causes flexures of the outer but not of the inner tube, the latter is subjected to the effect of the daily and seasonal fluctuations in temperature as well as of mechanical influences (shocks, etc.). In the event of the material not being exactly the same for all parts and not homogeneous within the individual parts alterations in the form will occur as a result of fluctuations in temperature. These alterations will cause changes in the spacing between the measuring marks and the reflecting surfaces belonging to the two paths of imaging rays. A change in spacing amounting to more than one thousandth of a millimetre is sufficient to invalidate the demands for accuracy required of rangefinders. The same applies if one reflecting surface or both of them are dislocated by the said amount at right angles to the axis of the inner tube. Whereas a specially careful treatment of the material of the inner tube and of the prism-stool makes it possible to attain the necessary degree of homogeneousness, differences cannot be avoided between the expansion coefficients of the prism-stool and the ocular reflecting system which as a rule consists of glass. In addition to this it has not been possible so far to entirely solve the problem of a perfect connection between these two parts, on account of a mechanical attachment by pressure causing strains whilst cement-layers were subject to the influence of moisture and heat.

The invention is based on the idea to construct a reflecting system to deviate a convergent pencil of imaging rays, the reflecting system to be permanently connected with a measuring mark and with a carrier for fitting the said system into an optical measuring instrument, the construction to be carried through in such a way that whatever relative displacements may be occasioned by the aforesaid influences affect the measuring mark and the image point belonging to it in exactly the same manner. Failing to satisfy this condition a dislocation—as a result of the displacements—will occur between the measuring mark and the conjugate image point and cause inaccurate readings. The said problem can be solved if the carrier, in accordance with the invention, is secured in the measuring instrument by means of an axle whose center line in the virtual reflected image of the axial point of the plane of the measuring mark stands vertically on that particular plane where the deviation of the axial ray takes place, which as a rule applies to the measuring plane. The carrier, obviously, should be made of the same material as the reflecting system proper, or at least of a material having the same expansion coefficient, so as to avoid the occurrence of strains between the carrier and the reflecting system which—caused by fluctuations in temperature—are likely, for instance, to bring about deformations of the reflecting plane. Carrier, reflecting system and reflecting plane. Carrier, reflecting system and measuring mark accordingly form a rigid body and whatever displacements may occur in this body within the measuring instrument can only consist of rotational movements about the said axle. However in the case of all such movements the point of the axis lying in the measuring plane always represents the reflected image of the axial point of the plane of the measuring mark, and the measuring mark and its conjugate image point are subject to identical displacements. Displacements in the axle itself in the direction of the axial ray of the pencil of imaging rays entering the reflecting system have no detrimental effect as long as the observer's eye does not change its normal position, i. e., when the axis of the eye coincides with the optic axis of the eye-piece for observing the measuring mark and the image, which optical axis stands vertically on the axial ray of the pencil of imaging rays entering the reflecting system. Though owing to the last-said displacements the measuring mark and the image point separate from each other, they always do so in the direction of the optic axis of the eyepiece. The parallax occasioned thereby does not affect the reading and what minor deviation from the image plane may be connected therewith is easily overcome by the accommodation of the observing eye.

It is the displacements in the axle occurring at right angles to the aforementioned direction which would cause reading errors as in the case of these displacements the image point belonging to the measuring mark wanders away laterally to the optic axis of the eyepiece. Such displacements in the axle would occur if the instrument in which the reflecting system is secured experiences a flexure. However, flexures of this kind, as emphasized at the outset are prevented by the employment of an inner tube which does not partake in the flexures of the outer tube to any detrimental degree.

Experiments have shown that the detrimental displacements in the reflecting system brought about by thermal or mechanical influences upon the measuring instrument and which, generally, amounted to more than a hundredth of a millimeter can be reduced to the order of one thousandth of a millimeter by employing a reflecting system according to the invention. The inventive idea is not confined to reflecting systems with but one reflecting surface, but is applicable with equal advantage also to such reflecting systems where the imaging pencil of rays is reflected any number of times, and not only in the measuring plane. The axis of rotation of the reflecting system must accordingly always stand perpendicular upon that respective plane where the unsusceptibility of the reflecting system is of first importance, i. e., upon the measuring plane, even if the optic axis of the eyepiece should not fall in the measuring plane.

Figure 2:
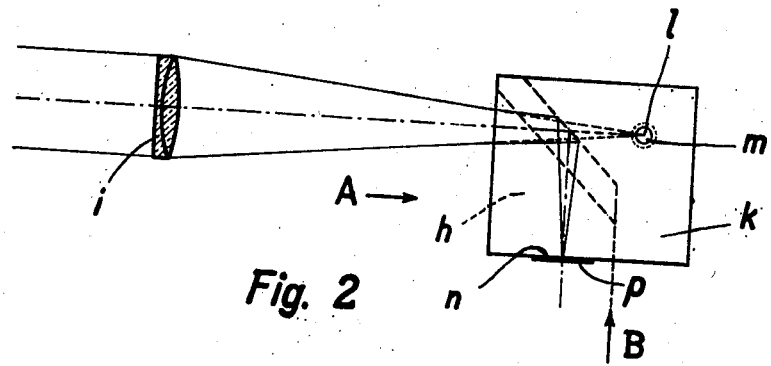
Figures 3, 4:
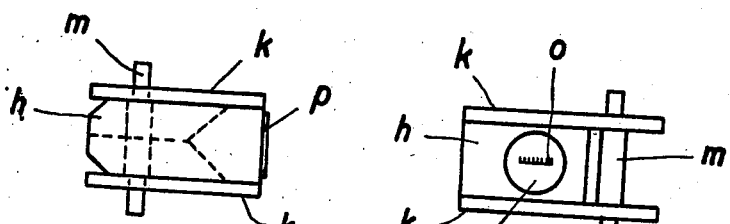

In the drawing attached hereto two constructional examples of the invention are illustrated, Fig. 1 showing the first example in section projected on the ground plan. In Fig. 2 a second example is shown in ground plan. Fig. 3 affords a view of the second example as seen in the direction of the arrow A of Fig. 2, whilst in Fig. 4 a view of it is given in the direction of the arrow B of Fig. 2.

In the case of the first example (Fig. 1) the reflecting system consists of a plane mirror $a$ with reflecting surface which is firmly connected with a carrier $b$ and with a pointer $c$. The reflecting system is intended to deviate at right angles a convergent pencil of imaging rays produced by an optical system $d$. If the reflecting system were absent the imaging rays would converge into a point $e$ of the axis of the pencil of imaging rays. This point $e$ represents the virtual reflected image of a point $f$ which is indicated by the apex of pointer $c$ and lies in the image plane of the objective. Point $e$ is an axial point of a bolt $g$ which stands perpendicularly upon the plane determined by the incident and reflected axial rays and which is intended to secure the carrier $b$ and the mirror $a$ to the instrument in question.

The second constructional example (Figs. 2 to 4) is an eyepiece reflecting system for a stereoscopical rangefinder. In this case the reflecting element is represented by a glass prism $h$, whose reflecting surface inclines at an angle of 45° relative to the direction of ingress of the axial ray of a convergent pencil of imaging rays produced by a rangefinder objective $i$, and which is designed as a tectiform surface for the purpose of erecting the image in height. The prism $h$ is cemented to a carrier consisting of two plano-parallel plates $k$ made of the same kind of glass. In the absence of the reflecting system the imaging rays would converge into a point $l$ of the axis of the entering pencil of imaging rays lying between the two glass plates $k$. In this point $l$ the axis of a bolt $m$ secured in bore holes in the glass plates $k$ stands perpendicular upon the plane determined by the entering and reflected axial rays. The bolt $m$ serves for securing the reflecting system in a prism-stool in the inner tube of the rangefinder. With due regard to the longer path of the rays in the glass a point $n$ of the exit surface of prism $h$ corresponds to point $l$. The said exit surface is the image plane of the objective and is equipped with a measuring mark $o$ which is covered with a glass plate $p$ to guard it against damage.

As a result of the carrier $k$, $k$ being supported by means of the bolt $m$ the only rotations the reflecting system can execute are those about the axis of the bolt and whereby the mark $o$ and the image $i$ produced by the objective experience identical displacements. In other words there would not during these rotational movements occur any dislocation between the image and the mark and the angular reading, accordingly, would not be misrepresented even if the deviating angle of the reflection is other than 90°.

I claim:

A reflecting system for deviating a convergent pencil of imaging rays, a measuring mark, means for supporting said reflecting system in an optical measuring apparatus, said measuring mark and said means being fixed to said reflecting system, said means consisting of holding means and an axle, the axis of said axle being perpendicular to the plane of the measuring mark in the virtual image produced by said reflecting system of that point in which said axis intersects the measuring plane.

NORBERT GÜNTHER.